(12) United States Patent
Brand et al.

(10) Patent No.: US 9,461,991 B2
(45) Date of Patent: Oct. 4, 2016

(54) VIRTUAL SMARTCARD AUTHENTICATION

(71) Applicant: Entersekt International Limited, Ebene (MU)

(72) Inventors: Christiaan Johannes Petrus Brand, Stellenbosch (ZA); Albertus Stefanus Van Tonder, Stellenbosch (ZA)

(73) Assignee: Entersekt International Limited, Ebene (MU)

( * ) Notice: Subject to any disclaimer, the term of this patent is extended or adjusted under 35 U.S.C. 154(b) by 0 days.

(21) Appl. No.: 14/648,387

(22) PCT Filed: Nov. 29, 2013

(86) PCT No.: PCT/IB2013/060509
§ 371 (c)(1),
(2) Date: May 29, 2015

(87) PCT Pub. No.: WO2014/083543
PCT Pub. Date: Jun. 5, 2014

(65) Prior Publication Data
US 2015/0319167 A1    Nov. 5, 2015

(30) Foreign Application Priority Data
Nov. 30, 2012  (ZA) .................................. 2012/09060

(51) Int. Cl.
*G06F 21/00* (2013.01)
*H04L 29/06* (2006.01)
(Continued)

(52) U.S. Cl.
CPC ......... *H04L 63/0853* (2013.01); *H04L 9/3263* (2013.01); *H04L 63/0823* (2013.01); *H04L 63/18* (2013.01); *H04W 12/06* (2013.01)

(58) Field of Classification Search
CPC .................................................. H04L 63/0853
See application file for complete search history.

(56) References Cited

U.S. PATENT DOCUMENTS 6,976,164 B1 * 12/2005  King ................... G06Q 20/202
                                                          705/21
2007/0005965 A1 * 1/2007  Nalliah ............... H04L 63/0823
                                                          713/168

(Continued)

FOREIGN PATENT DOCUMENTS

FI   WO 2006085169 A  *  8/2006  ......... H04L 63/0823
WO   WO2006/085169 A1     8/2006

OTHER PUBLICATIONS

Pala et al., "PorKI: Portable PKI Credentials via Proxy Certificates", Public Key Infrastructures, Services and Applications, Sep. 23, 2010, Springer Berlin Heidelberg, Berlin, Heidelberg.*

(Continued)

*Primary Examiner* — Morshed Mehedi
(74) *Attorney, Agent, or Firm* — Fish & Richardson P.C.

(57) ABSTRACT

The invention provides a system and method for signing a user workstation onto an access restricted network utilizing a mobile communication device. The method includes receiving a sign-on request from a mobile communication device of a user of the network, looking up a user certificate included in the sign-on request in an enrollment database and retrieving identifiers relating to the user, the workstation and network from the database, and transmitting a sign-on command to an authentication driver operating on the workstation, in response to which the authentication driver negotiates a sign-on operation of the workstation onto the network.

13 Claims, 3 Drawing Sheets

(51) Int. Cl.
*H04L 9/32* (2006.01)
*H04W 12/06* (2009.01)

(56) References Cited

U.S. PATENT DOCUMENTS

| | | | | |
|---|---|---|---|---|
| 2009/0037729 A1* | 2/2009 | Smith | .................. | H04L 9/3234 713/158 |
| 2011/0158406 A1* | 6/2011 | Marcia | .................... | G06F 21/10 380/200 |
| 2013/0007868 A1* | 1/2013 | Hoggan | ................ | H04L 9/3263 726/8 |
| 2014/0013109 A1* | 1/2014 | Yin | ..................... | H04L 63/0823 713/156 |
| 2014/0068252 A1* | 3/2014 | Maruti | .................. | H04L 9/0866 713/162 |
| 2014/0380063 A1* | 12/2014 | Kobayashi | ............ | H04L 9/3236 713/193 |

OTHER PUBLICATIONS

Massimiliano Pala et al., "PorKI: Portable PKI Credentials via Proxy Certificates", Public Key Infrastructures, Services and Applications, Springer Berlin Heidelberg, Berlin, Heidelberg, vol. 6711, pp. 1-16, (Sep. 23, 2010).

International Search Report for Intl. App. No. PCT/IB2013/060509, Apr. 15, 2014 (3 pages).

* cited by examiner

VIRTUAL SMARTCARD AUTHENTICATION

FIELD OF THE INVENTION

This invention relates to user authentication. More particularly, the invention relates to the authentication of a user and a workstation upon sign-on of the user with the workstation onto an access restricted private network.

BACKGROUND TO THE INVENTION

Access control to private computer networks and the protection of sensitive company information is of great importance to most companies.

In conventional access restricted networks, a user profile is created for each user that is allowed to access the network and this profile is stored and maintained by a database administrator within the network. One of the most common examples of such access restricted environments is found in a Microsoft® Windows environment and is controlled by so-called "Active Directory". Active Directory (AD) is a directory service created by Microsoft for Windows domain networks. It is included in most Windows Server operating systems and provides a central location for network administration and security. Server computers that run AD are called domain controllers. An AD domain controller authenticates and authorizes all users and computers in a Windows domain type network—assigning and enforcing security policies for all computers and installing or updating software. For example, when a user logs into a computer that is part of a Windows domain, AD checks the submitted password and determines whether the user is a system administrator or normal user and assigns privacy and usage rights to the user while he remains logged (signed) on to the network.

For many organisations the authentication and authorisation functionality provided by directory services such as AD is insufficient, as any person who is in possession of a valid username and password can generally access and interact with the network as if he is an authorised user.

To ensure the security and integrity of computer networks, Internet communications and ecommerce, organisations are often required to implement more advanced security measure than those provided for by standard usernames and passwords. For this reason additional security services such as Public Key Infrastructures (PKI) are used. PKI enables users of an otherwise unsecure public network, such as the Internet, or even access restricted private networks, to communicate and interact with the network securely through the use of private and public cryptographic key pairs. These key pairs are issued by trusted authorities and enable organisations to ensure that network resources are accessed and used by only authorised users, that confidential information is only accessed and disseminated by authorised users and that the identities of users carrying out specified functions and activities on the network can be verified.

Microsoft PKI for Windows is an example of such a PKI and enables organisations to secure and exchange information with strong security across the Internet, extranets, intranets and applications.

One way of implementing PKI in an access controlled network is to issue users with smartcards or other, hardware-based dongles or "tokens" that are configured with digital certificates including cryptographic key pairs, or that are configured to generate these cryptographic keys themselves. For their use, workstations that are allowed to log onto the network are fitted with authentication drivers and hardware readers configured to physically connect the tokens to the workstations. For a user to sign onto a network, the user has to insert the token into the reader in the workstation, after which the authentication driver negotiates the sign-on with the network server by means of certificate exchanges and mutual encryption. The digital certificates may also be used for encryption during the working session, which typically terminates as soon as the token is removed. Cryptographic smartcards are therefore often used for single sign-on operations.

Whilst being a very effective form of user authentication and network sign-on, smartcard (or other token) based digital identification has the disadvantage that users have to have the smartcards (or tokens) with them in order to sign on to the network.

In the remainder of this specification the term "workstation" should be broadly construed to include any computer or other data processing device by means of which a user may conduct a sign-on onto an access restricted network. It should also be appreciated that sign-on may occur from a workstation that is directly connected to the network being accessed, or remotely over a suitable distributed network such as the Internet.

SUMMARY OF THE INVENTION

In accordance with this invention there is provided a network sign-on system for use in an access restricted network comprising:
 a public key infrastructure ("PKI") provider operable to issue digital certificates to mobile communication devices;
 an authentication server in data communication with an enrolment database, the enrolment database containing records pairing digital user certificates with one or more of user, workstation and network identifiers;
 at least one workstation configured to access the network, the workstation having a unique workstation identifier associated with it and an authentication driver operating on it; and
 at least one mobile communication device associated with a user of the network having a unique digital user certificate installed on it which was previously issued to it by the PKI provider, wherein:
 the authentication server is operable to receive a sign-on request including the digital user certificate of the mobile communication device from the mobile communication device, to authenticate the mobile communication device using the digital user certificate, to look up one or more of a user, workstation and network identifier in the enrolment database contained in a record associated with the digital user certificate, and to transmit a sign-on command to the authentication driver operating on the workstation identified by the workstation identifier; and
 the authentication driver is operable to, upon receipt of the sign-on command from the authentication server, sign the workstation (16) onto the network through the authentication server, utilising public key encryption with the digital user certificate of the mobile communication device.

Further features of the invention provide for the at least one mobile communication device to have a sign-on application operating on it which enables the user to select a workstation and network for use of which it has been enrolled and onto which the user wishes to sign; and for authentication server to be operable to receive the sign-on request from the sign-on application.

Still further features of the invention provide for the sign-on command to include at least user and workstation identifiers; for the authentication driver to emulate a conventional Smartcard driver on a workstation; for the sign-on command to emulate the inserting of a conventional Smartcard into a Smartcard slot of a workstation; and for the authentication driver to sign the workstation onto the network by triggering a virtual smartcard insert operation upon receipt of the sign-on command.

Yet further features of the invention provide for the virtual smartcard insert operation to include identifying the user and workstation to a network server associated with the network, transmitting a challenge from the network server to the authentication driver, forwarding the network challenge via the authentication server to the mobile communication device of the user, receiving the challenge at the mobile communication device by means of the sign-on application, signing the network challenge with a private key of the device certificate installed on the mobile communication device, transmitting the signed network challenge back to the authentication driver on the workstation via the authentication server, forwarding the signed network challenge to the network server, validating a signature of the device using a public key associated with the device certificate and signing the workstation onto the network upon a successful validation.

Further features of the invention provide for the authentication server to also be the PKI provider; for the PKI provider to be configured to provide certificates to workstations; and for the workstation identifier to be a digital certificate provided by the PKI provider.

The invention also provides a method of signing a user workstation onto an access restricted network, the method being conducted at an authentication server and comprising the steps of:
  receiving a sign-on request including a digital user certificate associated with a mobile communication device of a user of the network, the request having been initiated from the mobile communication device and the digital user certificate having previously been issued to the mobile communication device by a public key infrastructure (PKI) provider;
  looking up the user certificate in an enrolment database and retrieving one or more of a user identifier of the user, a workstation identifier and a network identifier of the workstation and network onto which the user wishes to sign; and
  transmitting a sign-on command to an authentication driver operating on the workstation identified by means of the workstation identifier in respect of a user identified by means of the user identifier, in response to which the authentication driver negotiates a sign-on operation of the workstation onto the network.

A further feature of the invention provides for the method to include the step of verifying the validity of the digital user certificate upon receipt thereof.

Still further features of the invention provide for the method to include the steps of receiving a network challenge from the authentication driver operating on the workstation; forwarding the network challenge to the mobile communication device of the user; receiving a signed network challenge from the mobile communication device, the network challenge having been signed with the digital certificate of the mobile communication device; and forwarding the signed network challenge to the authentication driver for use during sign-on.

BRIEF DESCRIPTION OF THE DRAWINGS

The invention will now be described, by way of example only with reference to the accompanying representations in which.

DETAILED DESCRIPTION WITH REFERENCE TO THE DRAWINGS

Figure 1:
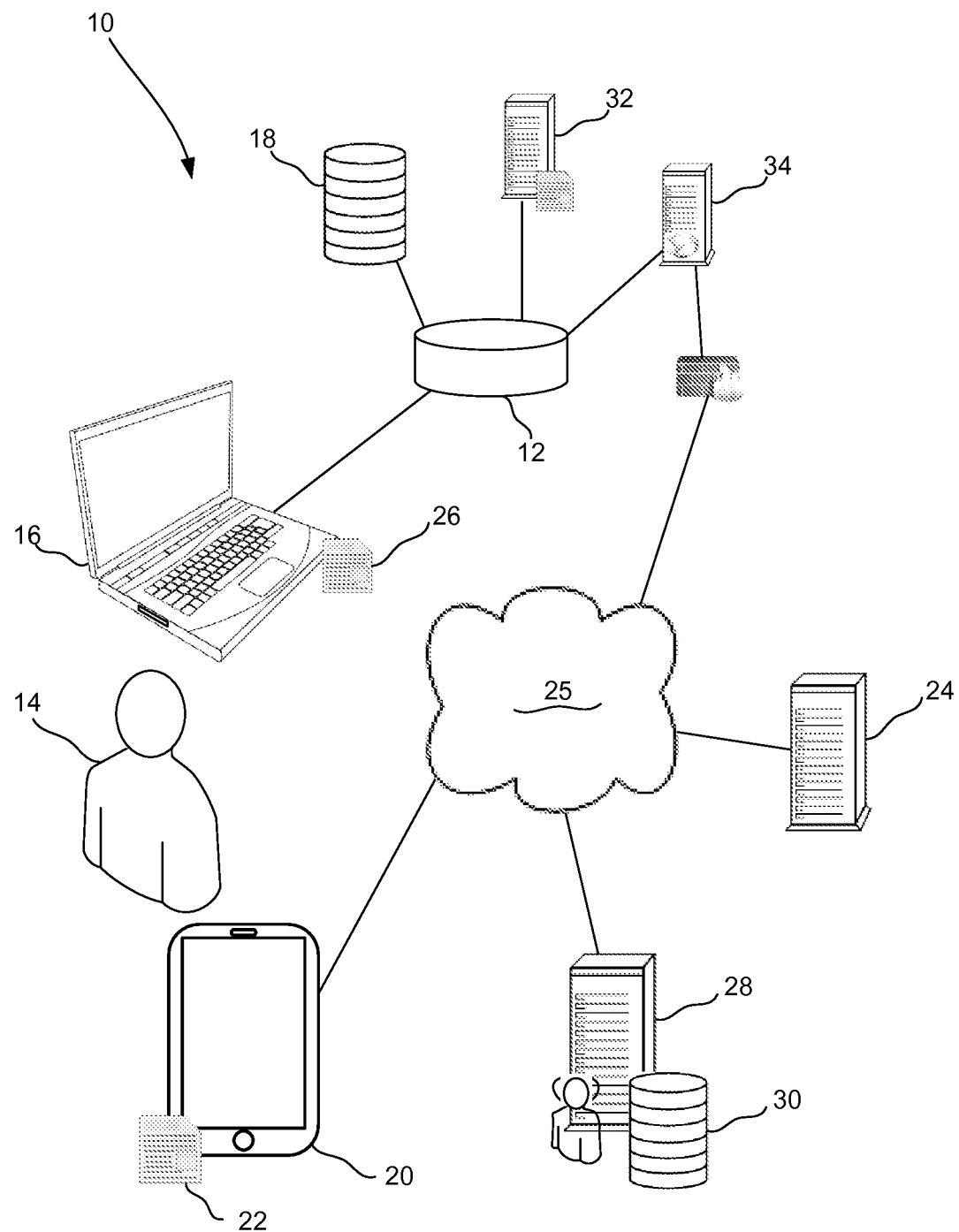
FIG. 1 is schematic representation of a sign-on system for an access restricted network in accordance with the invention.

A sign-on system (10) for use in an access restricted network (12) is shown in FIG. 1. The network (12) is accessible by a plurality of users (14) from workstations (16) which may include personal computers, laptops and other network enabled devices. Sign-on of the workstation (16) onto the network (12) may be conducted over a local area network, wide area network, distributed area network or the Internet. Each user (14) of the system has a profile on the network (12), the details of which are stored in a user database (18) which forms part of the network (12). The user profile will, for example, include a user identifier and may specify the user's security clearance, access restrictions, identification credentials and the like, and determines how the user (14) is able to interact with the network once he or she is signed-on (also referred to as "logged on") to the network (12) from the workstation (16).

Each user (14) of the network (12) also has a mobile communication device (20) such as a mobile phone, tablet or the like associated with him or her. The mobile device (20) has a digital certificate (22) stored on it which was previously issued to it by a public key infrastructure (PKI) provider (24). The certificate (22) is uniquely associated with and bound to the mobile device (20) and includes a mobile device public key associated with a mobile device private key which is only known to the mobile device and by means of which the mobile device (20) is able to conduct data encryption with other devices over public data networks (25) such as the Internet.

The workstation (16) has a unique identifier (26) by means of which it may be identified on the network (12). It should be apparent that the identifier (26) may be another digital certificate issued to the workstation (16) by the PKI provider (24). In addition, the workstation (16) has an authentication software module or driver operating on it which is configured to sign the user (14) onto the network (12). The authentication driver may be of the kind conventionally used by on-board smartcard readers provided in workstations.

The user's mobile device (20) also has a sign-on application operating on it by means of which the user (14) can authenticate himself and initiate the sign-on of the workstation (16) onto the network (12). In order to use the sign-on application, the user (14) has to first be enrolled for use of the system with an authentication server, which in the current embodiment of the invention is implemented by means of a cloud server. For ease of reference and to avoid confusion with other servers operating within the system, this authentication server will be referred to as the authentication service (28).

Figure 2A:
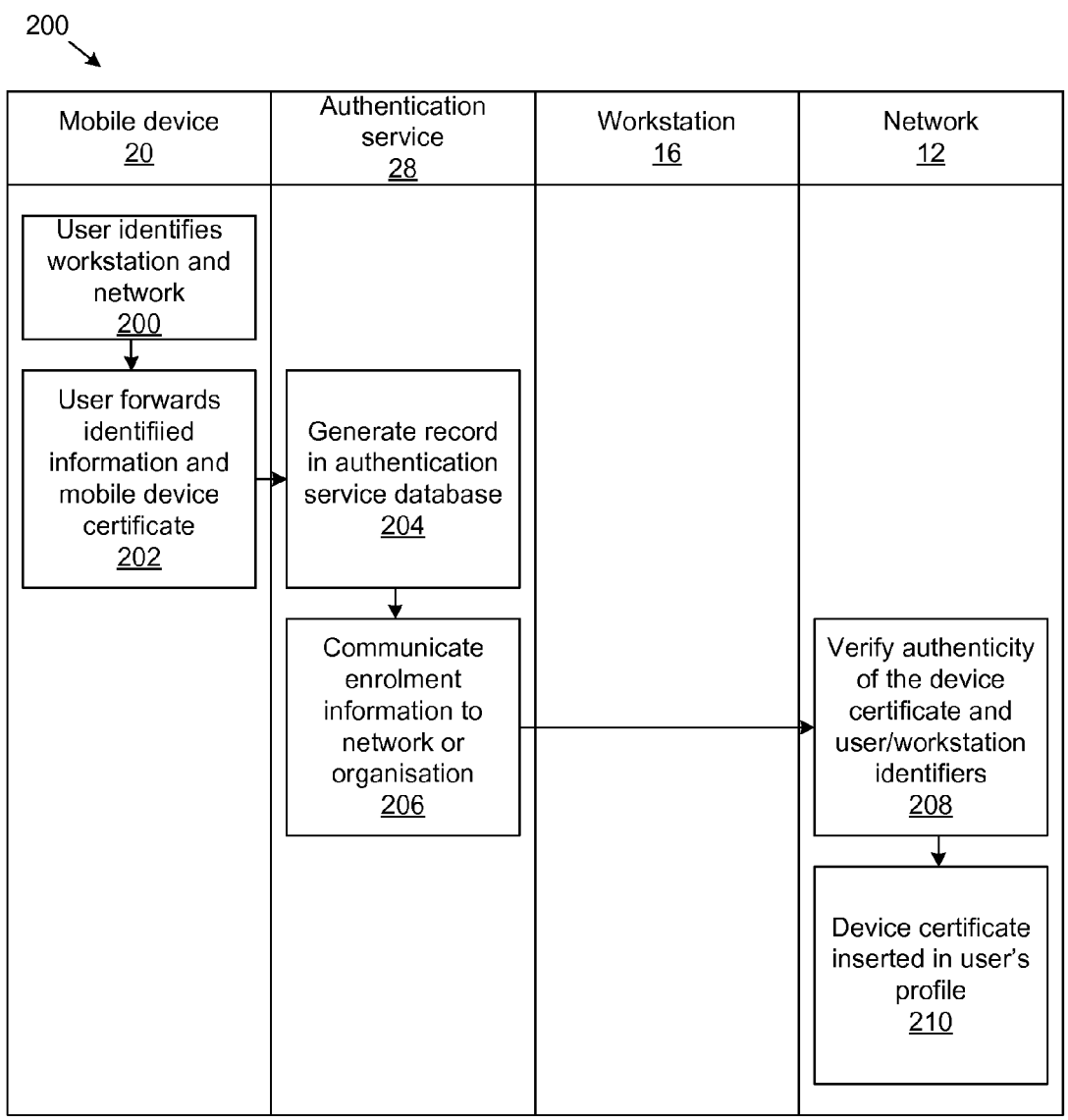
FIG. 2A is a swim-lane flow diagram illustrating a method of enrolling for sign-on authentication, using the system of FIG. 1.
Figure 2B:
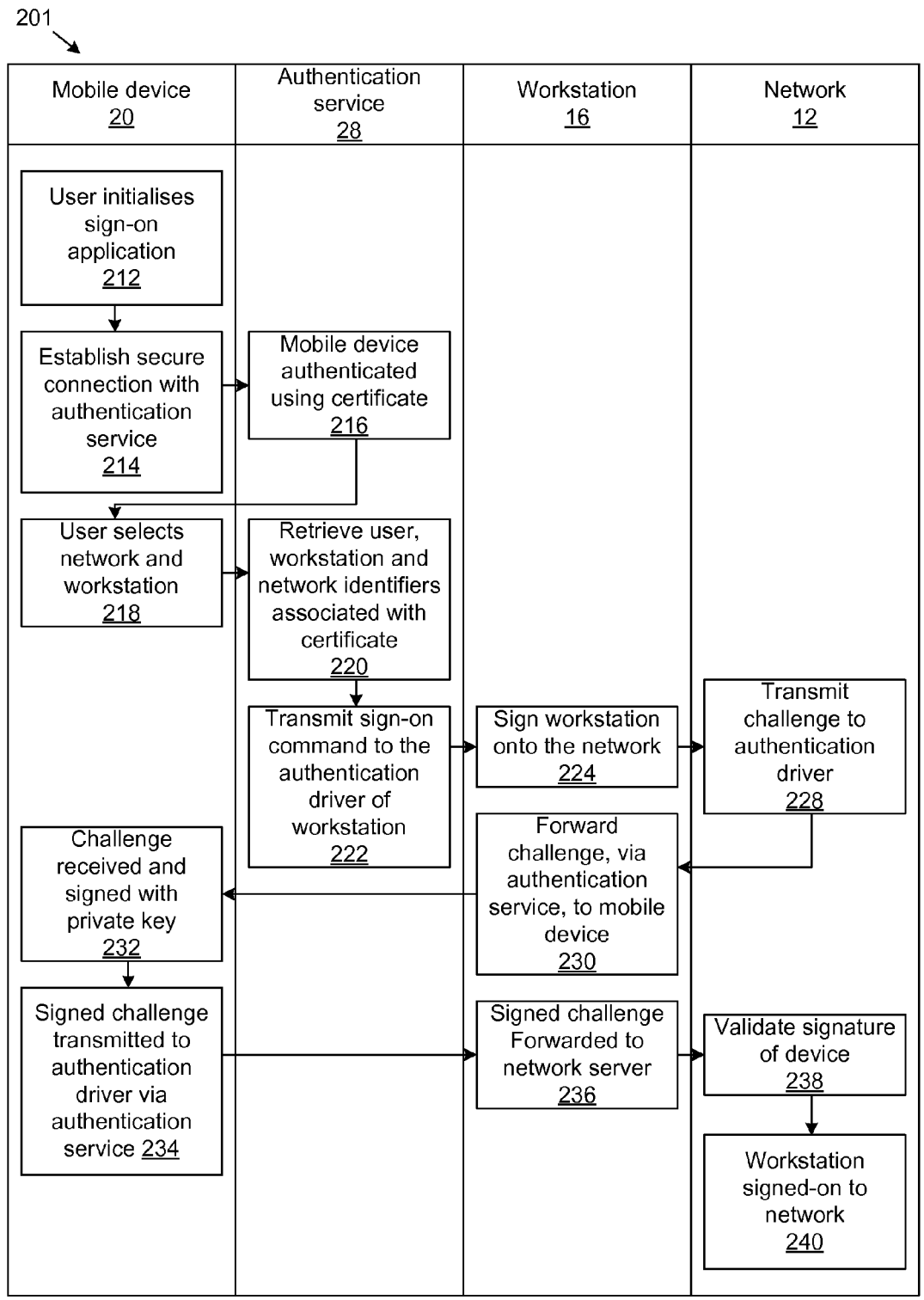
FIG. 2B is a swim-lane flow diagram illustrating a method of conducting a sign-on authentication, using the system of FIG. 1.

The flow diagrams (200, 201) of FIGS. 2A and 2B illustrates a first method of validating a transaction using the system of FIG. 1. The swim-lanes indicate responsibilities of and actions performed by a mobile device (20) of a user, the authentication service (28), the authentication driver operating on the workstation (16), and the network (12), respectively, in conducting the method according to the invention. Various responsibilities of, or actions performed by, the network (12), may in fact be performed by associated components of the network (12), for example, a network server (32), a web server (34), a database (18), or the like.

FIG. 2A illustrates a typical scenario, during enrolment of the user for use of the system from his or her mobile device (20), in which the user identifies at a first step (200) the workstation (16) from which he or she wishes to access the network (12) as well as the network itself, by means of a network identifier, and forwards this information at step (202), together with the mobile device certificate (22), to the authentication service (28) by means of the sign-on application on the mobile device (20). The authentication service (28) at step (204) then generates a record in an authentication service database, also referred to herein as an enrolment database (30), which includes the device certificate (22), or at least a certificate identifier, the user identifier, the workstation identifier (26) and the network identifier. Also as part of the enrolment process, the authentication service (28) communicates, at step (206), the enrolment information to the network (12) or organisation identified by means of the network identifier, which in turn verifies at step (208) the authenticity of the device certificate (22), the user's identifier and possibly other credentials, and ensures that the workstation identifier (26) relates to a workstation (16) that is allowed to access the network. Once the network (12) as satisfied itself of the authenticity of the device certificate (22) and the user and workstation identities, the device certificate (22) or simply a certificate identifier, is inserted in the user's (16) profile in the user database (18) at step (210). It should immediately be apparent that, in order to do so, the user profile may be incorporated as part of an Active Directory (AD) profile of the user in a Windows domain.

It should also be appreciated that, due to the unique nature of the device certificate (22) and the ability to uniquely identify the user's mobile device (20) by way of the certificate (22), a user may be enrolled to sign-on to a number of different networks associated with any number of different organisations, from as many different workstations as he is enrolled for, all from the same mobile device (20).

As is the case with conventional access restricted networks, a user will only be allowed access to the network and his or her profile from a workstation, if he or she is able to sign on to the network by way of an authentication process. The system according to the invention provides such a sign-on authentication system.

FIG. 2B illustrates a typical transaction validation scenario taking place after the user (14) has enrolled in the system of FIG. 1. If the user (14) wishes to sign-on to the network (12) from the workstation (16), he or she initialises the sign-on application on the mobile device (20) at step (212), which in turn establishes a secure connection with the authentication service (28) at step (214). The mobile device (20) is then authenticated by the authentication service (28) at step (216) using the device certificate (22), and the user is presented with a selection of the workstations and networks for which he or she has been enrolled. The user then, at step (218), selects the network and workstation onto which he wishes to sign and selects a sign-on function provided by way of a user interface on the mobile device. When the selection is made, the authentication service (28) at step (220) looks up the mobile device certificate (22), or simply a certificate identifier, in the enrolment database (30) and retrieves the user, workstation and network identifiers associated with the certificate.

Once the workstation (16) onto which the user wishes to sign has been identified, the authentication service (28) transmits at step (222) a sign-on command to the authentication driver operating on the workstation (16) identified by way of the workstation identifier to sign the user onto the network (12). The sign-on command is transmitted directly to the authentication driver operating on the workstation (16) over an active connection between the authentication service (28) and the workstation (16). The active connection may be established via a web server (34) responsible for handling incoming communication into the network (12) but it should be appreciated that at the time of receiving the sign-on command, the active connection may already have been established. The authentication drivers operating on workstations (16) on the network (12) may be tasked with ensuring that an active connection is maintained with the authentication service (28) at all times when the workstation is connected to the network (12), to ensure that sign-on may be conducted without delays.

Upon receipt of the sign-on command from the authentication service (28), the authentication driver on the workstation (16) attempts at step (224) to sign the workstation onto the network (12) by identifying the user and workstation to a network server (32). The network server (32) in turn transmits at stage (228) a challenge to the authentication driver which forwards the challenge at step (230), via the authentication service (28), to the mobile device (20) of the user (14) where the challenge is received by the sign-on application and is signed with the private key of the device certificate (22) installed on the device (20) at step (232). At step (234), the signed challenge is then transmitted back to the authentication driver on the workstation (16) via the authentication service (28), from where it is forwarded to the network server (32) at step (236). Upon receipt of the signed challenge the network server (32) validates the signature of the device (20) at step (238), using the public key associated with the device certificate stored against the user's profile in the user database (18).

Only if the validation of the device signature is successful will the workstation be signed-on to the network (12) at step (240).

It should immediately be apparent that only if the user's mobile device is in possession of a valid user certificate that is capable of being verified by the network server, and the user is enrolled for sign-on onto the network from a specified workstation, will sign-on be successful.

It should also be appreciated that the authorisation driver may operate in substantially the same way as a conventional authorisation driver associated with a smartcard reader incorporated in a workstation would. In conventional smartcard authorisation drivers the network challenge would be signed with a digital certificate that is provided by the smartcard. Communication would therefore be conducted between the authorisation driver and the smartcard reader during the signing process. Instead of communicating with the smartcard reader, in the current invention the authorisation driver communicates directly with the authentication service which, in turn, achieves the signing of the network challenge by communication with the sign-on application on the mobile communication device. Conventional smartcard authorisation systems may therefore be easily adapted into systems according to the present invention. After sign-on has been achieved, it should be appreciated that interaction between the workstation and the network could proceed in conventional fashion. The authentication driver and system according to the invention therefore emulates a conventional insertion of a smartcard into a smartcard slot on a workstation.

Similarly, if a user selects an "eject smartcard" function on the sign-on application in his or her mobile device, a corresponding sign-off command may be sent to the workstation and authentication driver. The system and method according to the invention therefore virtualises the operation of a conventional smartcard sign-on system and alleviates the need for authorised users of a network to carry smartcards or other digital identification tokens with them.

The foregoing description has been presented for the purpose of illustration; it is not intended to be exhaustive or to limit the invention to the precise forms disclosed. Persons skilled in the relevant art can appreciate that many modifications and variations are possible in light of the above disclosure without departing from the scope of the invention. For example, it is envisaged that a single user may be enrolled for use of the system in respect of multiple workstations on multiple networks. By selecting the appropriate network onto which he or she wishes to sign, as well as the workstation from which he or she wishes to do so, the system may send the appropriate sign-on on command to the correct workstation. If a user is, however, only enrolled for sign-on onto a single network from a single workstation it may not, however, be necessary for the user to specify any information. Likewise, if a user is only enrolled for sign-on from a single workstation in a given network, he may only have to specify the network.

It is also envisaged that the PKI may be part of the access controlled network and that certificate issuance and/or cryptographic key pair generation and allocation may therefore be handled internally by the network. In addition to the authentication conducted by the authentication driver, the user may also be required to enter additional information such as a randomly generated one-time-pin, on the workstation from which he wishes to sign-on to the network. This will ensure that the user and workstation have to be in the same physical location to affect sign-on.

The system and method described may be particularly adaptable for use in a Microsoft PKI environment and may alleviate the need for smartcards and/or other digital authentication tokens completely. It is envisaged that the system and method according to the invention may enable seamless integration with existing smartcard-based authentication systems as it may appear to the network system that a user is in fact inserting his or her issued smartcard into the workstation where in fact the insertion is accomplished in a virtual manner through use of the user's mobile communication device which, in most cases, will be the user's mobile phone which has a digital user certificate issued to it by the PKI provider installed on it. A user's mobile phone may therefore be used to replace a smartcard in existing smartcard based authentication systems.

It should furthermore be appreciated that various distinct components of the system described may be physically or geographically combined, thereby simplifying the system described. For example, it is foreseen that the authentication service may form part of the network infrastructure, instead of being a physically isolated and removed entity.

Some portions of this description describe the embodiments of the invention in terms of representations of operations on information. These descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A network sign-on system for use in an access restricted network comprising:
   a public key infrastructure ("PKI") provider operable to issue digital certificates to mobile communication devices;
   an authentication server in data communication with an enrolment database, the enrolment database containing records pairing digital user certificates with one or more of user, workstation and network identifiers;
   at least one workstation configured to access the network, the workstation having a unique workstation identifier associated therewith and an authentication driver operating thereon; and at least one mobile communication device associated with a user of the network having a unique digital user certificate installed thereon which was previously issued to the mobile communication device by the PKI provider, wherein:
   the authentication server is operable to receive a sign-on request including the digital user certificate of the mobile communication device from the mobile communication device, to authenticate the mobile communication device using the digital user certificate, to look up one or more of a user, workstation and network identifier in the enrolment database contained in a record associated with the digital user certificate, and to transmit a sign-on command to the authentication driver operating on the workstation identified by the workstation identifier; and
   the authentication driver is operable to, upon receipt of the signon command from the authentication server, sign the workstation onto the network through the authentication server, utilizing public key encryption with the digital user certificate of the mobile communication device.

2. A network sign-on system as claimed in claim 1, wherein the at least one mobile communication device has a sign-on application operating thereon which enables the user to select a workstation and network for use of which the user has been enrolled and onto which the user wishes to sign.

3. A network sign-on system as claimed in claim 2, wherein the authentication server is operable to receive the sign-on request from the sign-on application.

4. A network sign-on system as claimed in claim 1, wherein the sign-on command includes at least user and workstation identifiers.

5. A network sign-on system as claimed in claim 1, wherein the authentication driver emulates a conventional Smartcard driver on a workstation.

6. A network sign-on system as claimed in claim 5, wherein the signon command emulates the inserting of a conventional Smartcard into a Smartcard slot of a workstation.

7. A network sign-on system as claimed in claim 6, wherein the authentication driver signs the workstation onto the network (12) by triggering a virtual smartcard insert operation upon receipt of the sign-on command.

8. A network sign-on system as claimed in claim 6, wherein the virtual smartcard insert operation includes identifying the user and workstation to a network server associated with the network, transmitting a challenge from the network server to the authentication driver, forwarding the network challenge via the authentication server to the mobile communication device of the user, receiving the challenge at the mobile communication device by means of the sign-on application, signing the network challenge with a private key of the device certificate installed on the mobile communication device, transmitting the signed network challenge back to the authentication driver on the workstation via the authentication server, forwarding the signed network challenge to the network server, validating a signature of the device using a public key associated with the device certificate and signing the workstation onto the network upon a successful validation.

9. A network sign-on system as claimed in claim 1, wherein the authentication server is also the PKI provider.

10. A network sign-on system as claimed in claim 1, wherein the PKI provider is configured to provide certificates to workstations and wherein the workstation identifier is a digital certificate provided by the PKI provider.

11. A method of signing a user workstation onto an access restricted network, the method being conducted at an authentication server and comprising the steps of
  receiving a sign-on request including a digital user certificate associated with a mobile communication device of a user of the network, the request having been initiated from the mobile communication device and the digital user certificate having previously been issued to the mobile communication device by a public key infrastructure (PKI) provider;
  looking up the user certificate in an enrolment database and retrieving one or more of a user identifier of the user, a workstation identifier and a network identifier of the workstation and network onto which the user wishes to sign; and
  transmitting a sign-on command to an authentication driver operating on the workstation identified by means of the workstation identifier in respect of a user identified by means of the user identifier, in response to which the authentication driver negotiates a sign-on operation of the workstation onto the network through the authentication server, utilizing public key encryption with the digital user certificate associated with the mobile communication device.

12. A method as claims in claim 11, which includes the step of verifying the validity of the digital user certificate upon receipt thereof.

13. A method as claimed in claim 11, which includes the steps of receiving a network challenge from the authentication driver operating on the workstation; forwarding the network challenge to the mobile communication device of the user; receiving a signed network challenge from the mobile communication device, the network challenge having been signed with the digital certificate of the mobile communication device; and forwarding the signed network challenge to the authentication driver for use during sign-on.

* * * * *